Dec. 4, 1962     F. AKUTOWICZ     3,066,637
VEHICLE PROPULSION APPARATUS
Filed Sept. 18, 1961
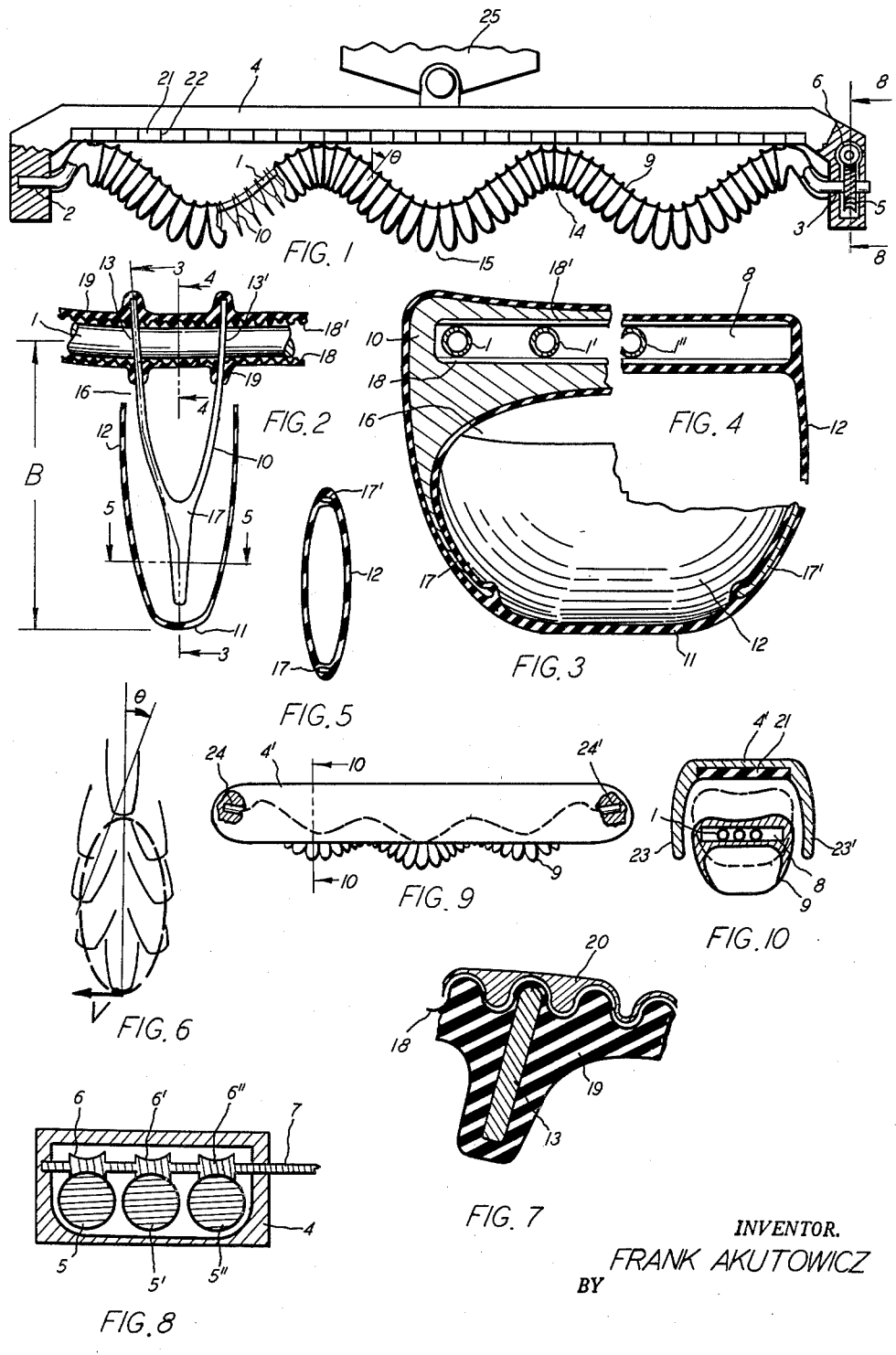
INVENTOR.
FRANK AKUTOWICZ
BY

3,066,637
VEHICLE PROPULSION APPARATUS
Frank Akutowicz, 2007 Harvey Road, Wilmington 3, Del.
Filed Sept. 18, 1961, Ser. No. 138,893
1 Claim. (Cl. 115—1)

This invention is for an apparatus for propelling a vehicle over land or water. The apparatus resembles a caterpillar both in appearance and action, except for much faster operation. There are four essential elements combined to produce the desired result:

(1) A helical shaft,
(2) A flexible, bellows-like envelope containing the shaft in an (3) internal armored slot situated horizontally at a distance from the ground,
(4) And a sequence of stiffening, vertebra-like members to insure that the envelope deformation is a bending action instead of a shearing action.

As the envelope is installed on the shaft it assumes a sinusoidal configuration in elevation, but remains straight in plan view. As the shaft rotates (being driven by a conventional engine and drive train) an individual vertebra oscillates up and down like the motion of a scotch yoke with horizontal slot. At the same time the ground contacting distal part of the vertebra kicks fore and aft in unison with the upward and downward inclination of the helical shaft, which passes through the proximal part of the vertebra. These two motions combine to produce an elliptic trajectory for the distal portion of the vertebra. The forward velocity of the vehicle is the velocity with which the vertebra sweeps through the bottom of the ellipse.

As seen in elevation, the envelope motion is a backward wave, the speed of which is usually slightly greater numerically than the vehicle ground speed. If needed, this wave motion is available to propel the vehicle in water, the individual oscillations accelerate quantities of water and mud and thus exert considerable hydrodynamic thrust.

The faster moving backward wave creates an amusing optical illusion in that the apparatus always seems to be laboring and slipping. Actually the motion is an easy rolling over the tips of the casing enclosing the vertebrae.

The invention has use wherever wheels provide insufficient mobility for a vehicle, or where amphibious operation is desirable. The embodiment shown in the drawing is particularly suited to amphibious operation since it is entirely enclosed within the rubber envelope 9 which is filled with air, and provides floatation for a vehicle. Such a vehicle can be driven with impunity from land to water and vice versa without special preparation and without any change in the mode of operation of the vehicle. My copending application Serial No. 140,100, filed September 22, 1961, is for a marine propulsion apparatus using the same principle.

FIGURE 1 shows the propulsion apparatus mounted in a frame 4. It is understood that frame 4 is suitably mounted under a vehicle 25 shown only partially. Part of the enveloping rubber bellows 9 is shown cut away revealing the skeleton structure comprising vertebrae 10 and helical shaft 1. FIGURE 2 shows vertebra 10 enlarged, a portion of helical shaft 1, and corrugated armor 18, 18' interposed between vertebra 10 and shaft 1. FIGURES 3, 4 and 5 are sections 3—3, 4—4 and 5—5 respectively of FIGURE 2. FIGURE 6 shows the trajectory followed by tip 11 as seen from a reference fixed to the frame 4. FIGURE 7 shows a detail of slot armor 18. FIGURE 8 is view 8—8 of FIGURE 1, and shows a synchronous driving arrangement for the shafts 1, 1', 1". FIGURE 9 shows another embodiment of the apparatus, and FIGURE 10 is section 10—10 of FIGURE 9.

Shaft 1 is fixed in trunnions 2 and 3 mounted in frame 4. It is understood that the direction of motion of the vehicle is to the left and right as seen in FIGURE 1. Shafts 1, 1', 1" are rotated by gears 5, 5', 5" which are driven by worms 6, 6', 6" keyed on common shaft 7. As shafts 1, 1, 1" rotate they traverse horizontal slot 8 situated inside envelope 9 and visible in FIGURES 3, 4 and 10. Slot 8 is embraced by vertebra 10. Consequently vertebra 10 oscillates vertically once per revolution of shafts 1, 1', 1". As the vertebra rises, however, toe 11 of casing 12 kicks to the rear in response to the rising inclination of the helix passing through the separated plates 13, 13'. This inclination constantly changes from zero at bottom dead center to $-\theta$ midway up, to zero again at top center, then to $+\theta$ and back to zero again. These two cyclic motions, the vertical and the kicking, occur simultaneously and cause toe 11 to follow an elliptic trajectory as shown in FIGURE 6. Toe 11 sweeps through the bottom of the trajectory at a speed V given by $V = B\omega \cot \theta$. B is the rolling radius, the distance from the centerline of shaft 1 to toe 11 in contact with the ground. $\omega$ is the angular velocity of shaft 1 in radians/unit time. $\theta$ is the complement of the helix angle and is measured as shown in FIGURE 1.

It is clear from the foregoing equality that when B goes to zero V goes to zero also—like kicking with an amputated leg. For the purpose of this invention, therefore, it is essential that the rolling radius be made as large as possible. The length B is limited by the congestion occurring at the tops of the waves as at 14. The congestion 14 cannot be transferred to the expansion at ground contact region 15 without suffering a loss in kick of toe 11, and a consequent reduction in performance of the vehicle. For this reason plates 13, 13' are separated to maintain the central transverse plane of vertebra 10 at right angles locally to shafts 1, 1', 1".

In the preferred embodiment congestion at 14 is accommodated by casing 12 which is filled with air at an overpressure of perhaps one atmosphere. Casing 12 communicates with its neighbors through the passage 16 so that the air squeezed out of zones 14 is available in the zones 15. Casing 12 is preferably made like a tire casing, i.e. rubber reinforced with tire cord. The speed of the vehicle is limited by the heat developed in flexing envelope 9 and particularly casing 12.

Vertebra 10 is doubly bifurcated—longitudinally into plates 13, 13' and transversely into ribs 17, 17'. The cross sections of ribs 17, 17' have a maximum section modulus oriented longitudinally so as to achieve a stiff kick in toe 11, and at the same time permit rib flexure in the plane of FIGURE 3 when toe 11 lands on a sharp obstacle. The outline of ribs 17, 17' forms the transverse cross sectional outline of casing 12 as shown in FIGURE 3. Casing 12 is bonded to ribs 17, 17', this being the preferred mode of transmitting driving force from shafts 1, 1', 1" to toe 11.

Plates 13, 13' are nested in transverse corrugations of slot armor 18, 18'. A detail of this nesting is shown in FIGURE 7. Rubber 19, bonded to plates 13, 13' and also to armor 18, 18', keeps the assembly from flying apart. Corrugated sheet 20, made of oil saturated sintered metal, fills the hollows in armor 18, 18' at the points of maximum stress in the vicinity of plates 13, 13'. The corrugations run transversely so that flexing is not inhibited.

Three drive shafts 1, 1', 1" are shown in the preferred embodiment. A plurality of drive shafts tends to prevent envelope 9 from twisting about a longitudinal axis in reaction to the driving torque in shafts 1, 1', 1", although it increases the total weight of the drive shafts for a given total torque. A plurality of drive shafts also makes possible the embodiment of FIGURES 9 and 10.

Soft rubber blocks 21 are shown on frame 4 to help carry the dead weight of the vehicle. This makes a very light construction possible for the entire apparatus. The blocks 21 have transverse slits 22 to permit some longitudinal flexure in 9, since there is a certain forward thrust exerted on 4 if contacted by envelope 9. This arises because the upper surface of 9 is at a slight distance above the centerline of shafts 1, 1', 1" and consequently there exists a slight kick which must be accommodated.

FIGURE 9 shows an embodiment with centerlines of shafts 1, 1', 1" bowed downward, being held in this configuration by extra thrust bearings 24, 24' at the two ends of frame 4'. Shafts 1, 1', 1" are actually coil springs, and in this embodiment are capable of providing a shock absorbing function as well as making steering much easier. A certain amount of lateral instability in introduced, however, and FIGURE 10 shows the guard rails 23, 23' to prevent lateral motion of envelope 9.

Extra traction on smooth ice can be had by equipping toe 11 with the transverse traction loop described in U.S. Patent 3,026,922.

I claim:

In a vehicle propulsion apparatus, including a vehicle, the combination of a frame extending in the direction of motion of said vehicle, a trunnion oriented substantially in said direction in said frame, a helical shaft rotatably mounted in said trunnion, means for rotating said shaft, a flexible envelope enclosing said shaft, said envelope including a horizontally directed slot with upper and lower slot boundaries in contact with said shaft, said envelope including a ground contact region distally located with respect to said slot, said envelope provided with armor on said upper and lower slot boundaries, said armor comprising transversely corrugated metal sheetings, said apparatus provided with vertebra-like stiffeners for said envelope, said stiffeners bifurcated both longitudinally and transversely, the longitudinal bifurcations constructed and arranged to embrace said slot armor in longitudinally separated planes, the transverse bifurcations constructed and arranged in flexible, rib-like configuration.

References Cited in the file of this patent
UNITED STATES PATENTS

| | | |
|---|---|---|
| 124,009 | Pierce | Feb. 27, 1872 |
| 144,538 | Harsen | Nov. 11, 1873 |
| 621,719 | Shann | Mar. 21, 1899 |